United States Patent [19]

Panovic

[11] Patent Number: 4,955,749
[45] Date of Patent: Sep. 11, 1990

[54] SWIVEL CONNECTOR

[76] Inventor: Vlatko Panovic, Suite 2404, 4221 Mayberry St., Burnaby, British Columbia, Canada, V5H 4E8

[21] Appl. No.: 367,629

[22] Filed: Jun. 19, 1989

[51] Int. Cl.$^5$ .............................................. B25G 3/00
[52] U.S. Cl. ...................................... 403/11; 403/27; 403/164
[58] Field of Search .................. 403/165, 164, 78, 11, 403/27; 59/95, 9

[56] References Cited

U.S. PATENT DOCUMENTS

| | | |
|---|---|---|
| 693,595 | 2/1902 | Frazier . |
| 933,625 | 9/1909 | Clarkson . |
| 1,432,059 | 10/1922 | Fullington . |
| 1,454,587 | 5/1923 | Gunn ........................................ 59/95 |
| 1,618,851 | 6/1925 | Thunberg . |
| 1,841,008 | 1/1932 | Burn . |
| 2,195,124 | 2/1938 | Skoverski . |
| 2,503,281 | 4/1950 | Lynch et al. ..................... 403/78 X |
| 2,762,639 | 9/1956 | Molter . |
| 3,270,494 | 9/1966 | Holmes ............................... 59/95 X |
| 3,504,937 | 4/1970 | Panovic . |
| 3,694,011 | 9/1972 | Silverman . |
| 3,707,303 | 12/1972 | Petri . |
| 4,403,885 | 9/1983 | Babb . |

Primary Examiner—Andrew V. Kundrat
Attorney, Agent, or Firm—Shlesinger & Myers

[57] ABSTRACT

The swivel connector permits two links, such as cables, chains, etc. to be quickly connected and disconnected without use of tools, and can pass over pulleys and through fairleads etc. The connector has a plug connector portion which has head and neck portions which are received in a complementary recess of a socket connector portion. The socket connector portion comprises second and third body members each having a longitudinally aligned main face with a recess generally complementary to one half of the neck and head portions. The connector portions have bearing surfaces which generate inwards forces on the second and third body members which tend to hold the second and third body members together so as to embrace the first body member. A resilient structure applies an outwardly directed axial force between the connector portions, which tends to force the main faces and bearing surfaces into engagement so as to initiate and enhance gripping of the two portions together. The connector portions are simple to manufacture and maintain, and when coupled together resist intrusion of foreign matter, such as dirt, etc., thus reducing wear from abrasive particles.

14 Claims, 12 Drawing Sheets

SWIVEL CONNECTOR

BACKGROUND OF THE INVENTION

The invention relates to a quick release connector for joining together lengths of cable, chains, etc. without use of special tools.

In many industries, such as fishing, logging, excavation, etc. there is a common requirement for connecting together lengths of cable, chains, rigid links, etc. Many connectors are available for this purpose, but some of these are costly to manufacture, and are prone to seizure or failure in the harsh environment of such industries. Furthermore, some couplings require use of special tools, which is often inconvenient and the tools can be misplaced.

Many cables are required to pass through fairleads or over pulleys, and thus the connector should be sufficiently small and unobstrusive to permit smooth passage of the connector through a fairlead or around the pulley. Clearly, it should be sufficiently strong to support any load that might be applied to the cables or other links and should be highly resistant to unintentional disconnection.

U.S. Pat. No. 3,504,937 was issued to the present applicant and discloses a snap lock swivel connector which overcomes many of the disadvantages of the prior art. However, the applicant's patented connector has a two-piece socket connector portion which has a relatively large lateral opening to receive a plug connector portion passing laterally therethrough. Dirt or other abrasive matter is prone to passing through this large lateral opening and can result in rapid wear of the coupling. Furthermore, the two main pieces of the socket portion are urged together by a C-shaped spring which, in some instances, does not generate an adequate force to grip the two portions together, and accidental disconnection can result.

SUMMARY OF THE INVENTION

The invention reduces the difficulties and disadvantages of the prior art by providing a relatively low cost, simple swivel connector which resembles, to some extent, some parts of the present applicant's prior patented connector. However, the present invention provides a simpler means of permitting rapid connection and disconnection of complementary connector portions without requiring a relatively large lateral opening as found on the patented connector. When the connector portions are coupled together, the portions in engagement are essentially fully enclosed, and contamination by dirt or other abrasive matter is reduced considerably from the prior art structure. The two portions of the present connector are fastened to ends of the links, and no separate parts or additional tools are required, thus preventing accidental dropping or loss of such parts or tools. The connector is smooth and rounded, and can pass easily through fairleads and over pulleys, etc. Furthermore, the C-shaped spring of the applicant's prior device has been eliminated and other means are provided to hold the present swivel connector together, which means provide other advantages as will be described.

A swivel connector according to the invention includes a plug connector portion and complementary socket connector portion. The plug connector portion comprises a first body member having an outer portion, a neck portion and a head portion. The outer portion has an eye to receive a first link, and the neck portion has a diameter less than the head portion and is concentric therewith about a longitudinal axis to provide a shoulder having a first bearing surface. The socket connector portion comprises second and third body members, in which each body member has a longitudinally aligned main face having a recess which is generally complementary to one half of the neck and head portions of the first body member to accept the said one half therein. Each recess has a semi-annular bearing surface positioned to engage a corresponding half of the bearing surface of the first body member when the main faces of the second and third body members are abutted to form a unit to enclose the neck and head portions of the first body member. The second and third body members each have a respective outer portion with a respective eye so that when the second and third body members cooperate with each other as the said unit, the eyes thereof are aligned with each other to receive a second link passed therethrough. The connector includes force generating means on at least one of the bearing surfaces for generating an inwards force on the second and third body members, which force tends to hold the second and third body members together. The swivel connector also includes resilient means for applying ar initiating force between the connector portions so as to force the complementary bearing surfaces into engagement with each other to generate the said inwards force.

A detailed disclosure following, related to drawings, describes a preferred embodiment of the invention which is capable of expression in structure other than that particularly described and illustrated.

DETAILED DISCLOSURE

Figure 1:
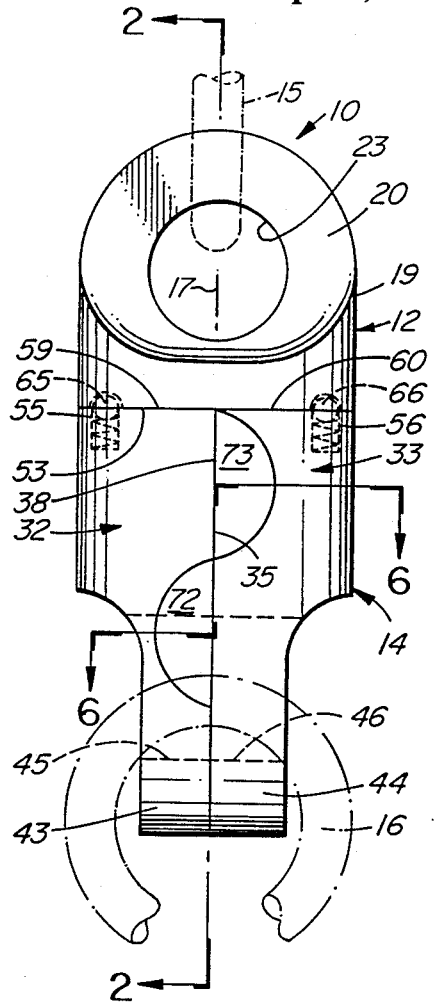
FIG. 1 is a simplified side elevation of the invention showing two connector portions of the swivel connector connected together, and showing locations in broken outline of portions of links cooperating with the connector portions.
Figure 2:
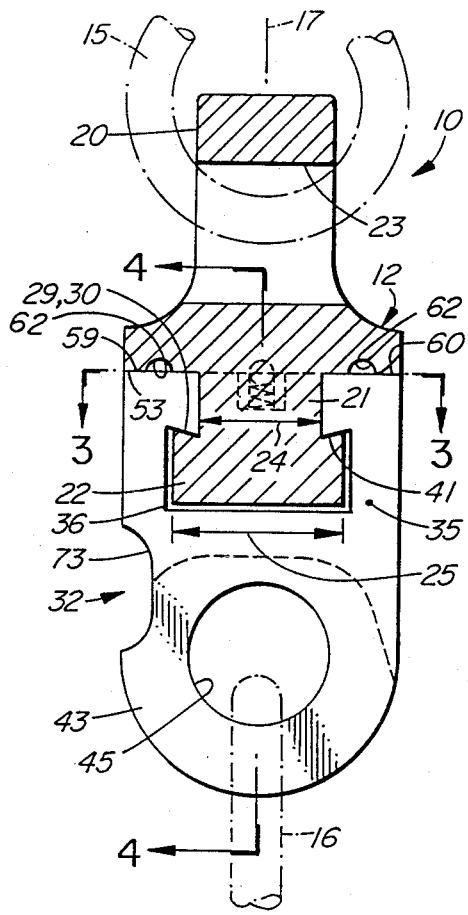
FIG. 2 is a simplified fragmented section of the invention as would be seen generally from line 2—2 of FIG. 1.

Referring to FIGS. 1 and 2, a swivel connector 10 according to the invention has a plug connector portion 12 and a socket connector portion 14 connected to respective first and second links 15 and 16, shown in broken outline. The plug connector portion 12 has a first body member 19 having an outer portion 20, a neck portion 21 and a head portion 22. The outer portion has an eye 23 to receive the first link 15, which can be an eye at an end of a cable. The neck portion 21 has a diameter 24 which is less than diameter 25 of the head portion. The neck and head portions are concentric about a longitudinal axis 17 of the connector, and the difference in the diameters 24 and 25 provides an annular shoulder 29 having a first bearing surface 30.

Referring to FIGS. 2 through 5, the socket connector portion 14 has generally similar second and third body members 32 and 33. The body member 32 has a longitudinally aligned main face 35 disposed on a diameter and having a recess 36 which is generally complementary to one half of the neck and head portions 21 and 22 of the first body member 10 to accept the said one half therein. The third body member 33 has a similar main face 38 and a similar recess 39 which similarly accepts the remaining one half of the neck and head portions 21 and 22 respectively. The recess 36 has a semi-annular bearing surface 41 which is positioned to engage a corresponding half of the first bearing surface 30 of the first body member when the head and neck portions 21 and 22 of the first body member are received in the recess 36. The recess 39 of the body member 33 has a similar annular bearing surface, not shown, positioned to engage a corresponding remaining half of the first bearing surface 30 when the main faces 35 and 38 of the second and third body members are abutted to form a unit to enclose the neck and head portions of the first body member.

As seen in FIGS. 1 and 2, the second and third body members each have a respective outer portion 43 and 44 with a respective eye 45 and 46, so that when the second and third body portions cooperate with each other as the said unit above, the eyes 45 and 46 thereof are aligned to receive the second link 16 passed therethrough.

Figure 5:
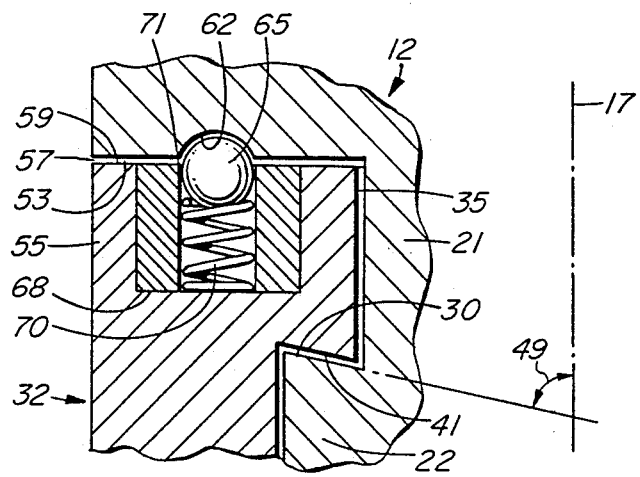
FIG. 5 is a simplified fragmented section, generally similar to FIG. 4, but at larger scale and showing parts of a plug connector portion cooperating with parts of the socket connector portion of FIG. 4.

As best seen in FIG. 5, the first bearing surface 30 of the member 19 is a portion of a conical surface concentric with the axis 17 and inclined thereto at an angle 49. The semi-annular bearing surface 41 of the second body member 32 is a portion of a conical surface, which is generally complementary to the first bearing surface 30 and is similarly inclined at the angle 49 to the axis 17. The semi-annular bearing surface of the third body member, not shown, is generally similar so that the bearing surfaces of the second and third body members 32 and 33 are portions of similar conical surfaces which are complementary to and cooperate with the bearing surface 30 of the first body member 19. When the second and third body members act as a unit and enclose the head and neck portions of the first body member, and outwardly directed axial forces are applied to the links 15 and 16, the angles of the complementary conical bearing surfaces 30, 41 and the conical surface of the member 33 generate inwards forces on the second and third body members directed towards the longitudinal axis 17 and tending to hold the second and third body members together. Thus the inclined conical bearing surfaces act similarly to cam surfaces to serve as force generating means tending to hold the second and third members together, so that the two members of the socket connector portion 14 function as a unit to enclose and grip the plug connector portion 12.

The above description describes structure which is generally similar to that found in the present applicant's U.S. Pat. No. 3,504,937 previously referred to. It can be seen that the force generating means include a cam surface e.g. the surfaces 30, 41 etc., on at least one of the bearing surfaces of a particular body member, the cam surface being inclined to the longitudinal axis 17 so as to generate the said inwards force on at least one of the second and third body members. The cam surface can be provided as a minimum on one of the members, although preferably similar cam surfaces should be provided on both the semi-annular bearing surfaces of the second and third body members. Also a complementary cam surface should be provided on the first bearing surface of the first body member so that all cam surfaces cooperate to generate the inwards force, and produce a relatively large bearing area to reduce bearing loads and wear of the bearing surfaces.

As previously stated, the Applicant's prior patent discloses a C-shaped spring (ring 41 of the patent) which embraces the two socket connector portions (equal sections A and B of the patent), so as to force the socket connector portions or sections together to enclose the plug connector portion (part 10 of the patent). As described in the said patent, when the plug portion is forced laterally into a T-shaped opening (slot 30 of the patent) of the socket portions, an outwards hinging force is generated on the socket portions which permits the plug portion to pass into the complementary recesses of the socket portions. The plug potion can be separated from the two socket portions by a twisting action which forces the socket portions apart. While this is satisfactory in some instances, complications can arise due to excessive wear of the components due to ingress of abrasive matter through the T-shaped opening of the socket portions. Furthermore, difficulty was encountered in manufacturing the C-shaped spring with sufficient strength to hold the two socket portions together to ensure integrity of the unit, while providing sufficient resilience to permit the two socket potions to open sufficiently to pass the plug portion through the T-shaped opening. The spring required considerable flexibility to accommodate the open position of the socket portions, and yet have sufficient strength to hold the socket portions closely together to prevent inadvertent opening of the socket portions. It is noted that force from the spring which draws the socket portions together acts in a direction at right angles to force on the connector portions when the connector portions are subjected to tensile force to generate the inwardly acting force which holds the socket portions together. This contrasts with the present invention as described below.

The present invention essentially eliminates this particular problem with the Applicant's prior art device by eliminating the C-shaped spring and providing other resilient means for holding the second and third body portions together so as to enclose the first body portion. The improved means for holding the second and third portions together includes first and second spring-urged detent members mounted on one connector portion to apply a force to the remaining connector portion to generate a component of (force parallel to the longitudinal axis. One specific embodiment for accomplishing this is described as follows.

As best seen in FIGS. 1, 2 and 5, the outer portion 20 of the first body member has an inwardly fairing annular face 53 disposed generally oppositely to the first bearing surface 30. The second and third body members 32 and 33 have respective inner portions 55 and 56 having respective semi-annular end faces 59 and 60. The end faces 53, 59 and 60 of the first, second and third members are disposed generally normally to the longitudinal axis 17. The annular face 53 of the first body member is disposed oppositely to and spaced closely from, the semi-annular end faces 59 and 60 of the second and third body members by a gap 57. The gap 57 is preferably as small as practical, for example about 0.5 millimeters so as to reduce ingress of foreign matter as will be described.

Figure 3:
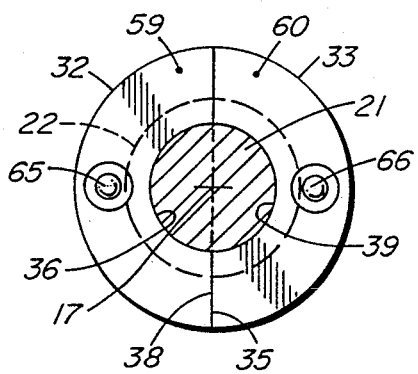
FIG. 3 is a simplified fragmented section as seen generally from Line 3—3 of FIG. 2, some additional hidden detail being shown.
Figure 4:
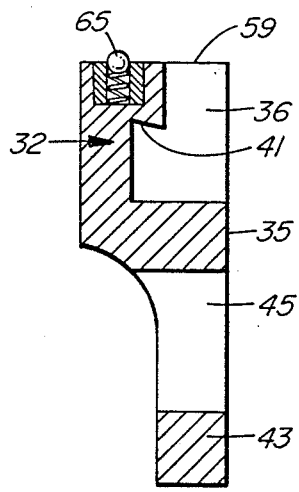
FIG. 4 is a simplified fragmented section as seen from Line 4—4 of FIG. 2, portions of a socket connector portion only being shown.

The annular face 53 has an annular groove 62 concentric with the longitudinal axis 17 extending therearound. As best seen in FIGS. 4 and 5, a spring-urged ball 65 projects from the semi-annular end face 59 of the second body member a distance greater than the gap 57 between the faces 53 and 59. As seen in FIGS. 1 and 3, a similar spring-urged ball 66 extends from the semi-annular end face 60, the balls being disposed on a circle equal to that of the annular groove 62. Thus, the annular groove receives the spring-urged balls of the second and third body members therein, so that the balls engage the groove and sweep the groove when there is relative rotation about the axis 17 between the plug connector portion 12 and the socket connector portion 14. The annular groove 62 has sufficient depth to provide a strong lateral or radial restraining force on the balls 65 and 66. This is to resist outward movement of the balls from the groove which tend to maintain the two members 32 and 33 closely together.

Referring to FIG. 5, the spring-urged ball 65 can be an off-the-shelf assembly comprising a chamber portion 68 having a bore disposed generally parallel to the longitudinal axis 17. The ball 65, serving as a detent member, is mounted for movement within the bore of the chamber portion generally parallel to the longitudinal axis. A coil spring 70 within the chamber portion forces the ball outwardly, and stop means 71 prevent the ball from leaving the chamber. The stop means 71 can be an upper rim portion of the chamber having a diameter less than the diameter of the ball to interfere with the ball. As best seen in FIG. 5, the annular groove 62 receiving the ball 65 has a depth sufficient to enclose a relatively large portion of the ball extending from the semi-annular face 59 of the second body member. The coil spring 70 has sufficient force to urge the ball outwardly and assist in retaining the ball within the groove.

It can be seen that the spring forces the ball outwardly into the groove, and applies a force tending to separate the socket and plug connector portions apart, which is similar to forces applied by the links 15 and 16 also tending to force the plug and socket connector portions apart. Thus, the force from the spring acts in the same direction as force from the links and thus acts in concert when the links are under tension. When the links are not under tension, the forces from the spring-urged balls, which serve as resilient means, generate a sufficient initiating force between the connector portions to force the complementary bearing surfaces into engagement with each other to generate the said inwards force, thus tending to hold the second and third body members together even when there is no tension applied to the links. This is in contrast to the force generated by the C-shaped member of the applicant's prior patent which acts in a direction perpendicular to force applied by tension from the links, and thus did not act in concert with such force. Also in contrast to the prior patent, it can be seen that the gap 57 between the end faces 59 and 60, and the annular face 53 are relatively small. Thus dirt and other abrasive material is less prone to passing into the gaps between the plug connector portion and the socket connector portion, which reduces a tendency of the components to wear when used in an abrasive environment.

Referring to FIG. 5, the minimum size of the gap 57 is dependent mainly on the angle 49 of the faces 30 and 41, the width of the faces and the angle of the faces 59 and 53 with respect to the axis 17, that is the squareness of those faces with respect to the axis 17. When the connector of the invention is new, the gap 57 is usually at its minimum. As the connector wears, the faces 30 and 41 become worn and the gap 57 correspondingly increases, and the ball 65 correspondingly projects further from the bore of the chamber portion 68. If the ball 65 projects excessively, force from the spring 70 is reduced and thus gripping force of the ball 65 in the groove 62 is also reduced. This could result in an unintentional disengagement of the connector by separation of one or both of the body members 32 and 33 from the first body member 19. To reduce the chances of accidental disengagement as a result of a worn connector, the connectors could be regularly visibly inspected, and if necessary, a tolerance could be established by which the connector would be retired if a feeler gauge of a pre-determined thickness could be inserted in the gap 57. This provides a safety feature which is not found in the Applicant's prior patent, or in other devices known to the Applicant.

Figure 6:
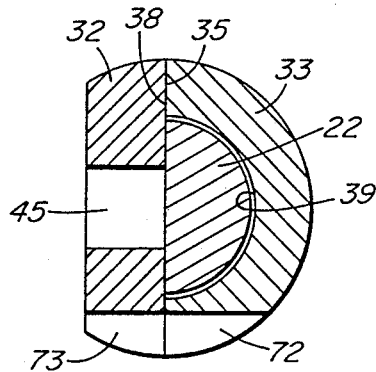
FIG. 6 is a simplified fragmented section generally on Line 6—6 of FIG. 1 showing means to permit easy separation of the socket connector portion.

As seen in FIGS. 1 and 6, the second and third body members 32 and 33 are provided with recesses 72 and 73 respectively which are adjacent edges of the longitudinally aligned main faces 35 and 38 thereof. The recesses are sufficiently large to receive a digit, for example a thumb, of an operator's hand therein to permit application of a twisting outwards force to the second and third body members for separating the second and third body members when the swivel connector is to be separated. While both second and third body portions are shown provided with a recess, at least one of the body portions should be provided to permit application of the outwards force to permit disassembly of the connector. Clearly, other means could be used to apply a force generally laterally of the longitudinal axis, for example a screw driver bit could be inserted between the aligned main faces of the second and third members.

OPERATION

In operation, it can be seen that the link 15 is attached to the first body member portion by way of an eye, and the link 16 is similarly attached to both second and third body members through a larger eye. Clearly, the eye of the link 16 should be sufficiently large to permit the body members 32 and 33 to move relative to each other to separate from the first body member.

To connect the connector portions together, it is simplest if one member of the socket portion, for example the second body member 32, is positioned to enclose one-half of the neck and head portions 21 and 22 of the first body member, with the ball 36 retained in the groove 62 on the end face 53 of the body member 19. The third body member 33 can then be swung about the eye 16 to enclose the remaining exposed portions of the head and neck portions 21 and 22, whereupon the ball 66 is resiliently retained in the groove 62. When so assembled, there is sufficient outwards force supplied by the spring urged balls 65 and 66 to hold the second and third body portions closely together, even when the coupling is subjected to relatively rough handling without the links being under tension. This is because the balls are retained in the annular groove, and permit relatively free swivelling between the portions 12 and 14, and force from the balls resist the tendency for the second and third body members to separate laterally. Furthermore, the axially disposed forces from the balls 65 and 66 forces the partially conical bearing surface 30 of the first member 19 against the semi-annular bearing surface 41 of the second member 32, and a similar bearing surface of the third body member 33, which generates the forces tending to hold the second and third body members together. Thus, the invention provides two separate means of retaining the three body members together, without a direct application of force by the links 15 and 16. Clearly, when the force is applied to the links 15 and 16, the forces generated by the partially conical bearing surfaces increases, further compounding a gripping force holding the three body members together.

When the swivel connector 10 is to be separated, preferably the operator grips the first body member 19 in the palms of his hands, and applies concurrently outwards forces to both the second and third body members by engaging respective thumbs in the recesses 72 and 73, tending to force open the second and third body members.

ALTERNATIVES

The annular groove 62 is shown provided in the first body member 19, and is engaged by one or more spring-urged detent members, e.g. the balls 65, 66 from the second and third body members. This is the preferred arrangement, as the annular groove is continuous, i.e. without joints or gaps, and permits essentially free swivelling between the connector portions. Alternatively, the spring-urged balls 65 and 66 could be located within chambers within the first body member, so as to project axially towards the second and third body members which would be provided with concentric semi-annular grooves equivalent to the groove 62. While this would function adequately, the balls would be required to pass over edges of the second and third body members as the connector portions swivel relative to each other. The edges would produce diametrically aligned gaps in the grooves between the second and third body members which would tend to aggravate wear of the balls, and require relatively close tolerances for manufacturing to reduce such wear.

The spring-urged detent members are shown to be balls, although clearly cylindrical plungers and other equivalents can be substituted. Similarly, other resilient means could be fitted to generate the axial force between the connector portions, tending to force the second and third body members together.

I claim:
1. A swivel connector comprising:
   (a) a plug connector portion having a first body member having an outer portion, a neck portion and a head portion, the outer portion having an eye to receive a first link, the neck portion having a diameter less than the head portion and being concentric therewith about a longitudinal axis to provide a shoulder having a first bearing surface,
   (b) a socket connector portion having second and third body members, each body member having a longitudinally aligned main face having a recess which is generally complementary to one half of the neck and head portions of the first body member to accept the said one half therein, each recess having a semi-annular bearing surface positioned to engage a corresponding half of the first bearing surface of the first body member when the main faces of the second and third body members are abutted to form a unit to enclose the neck and head portions of the first body member, the second and third body members each having a respective outer portion with a respective eye so that when the second and third body portions cooperate with each other as the said unit, the eyes thereof are aligned with each other to receive a second link passed therethrough,
   (c) force generating means on at least one bearing surface for generating an inwards force on the second and third body members, which force is directed towards the longitudinal axis and tends to hold the second and third body members together,
   (d) resilient means for applying an initiating force between the connector portions so as to force the complementary bearing surfaces into engagement with each other to generate the said inwards force.
2. A connector as claimed in claim 1, in which the force generating means has:
   (a) a cam surface on at least one of the bearing surfaces of a particular body member, the cam surface being inclined to the longitudinal axis so as to generate the said inwards force on at least one of the second and third body members.
3. A connector as claimed in claim 1, in which the force generating means comprises:
   (a) cam surfaces on the semi-annular bearing surfaces of the second and third body members, the cam surfaces being inclined to the longitudinal axis so as to cooperate with the first bearing surface so as to generate the said inwards forces on the second and third body members.
4. A connector as claimed in claim 1, in which the force generating means comprises:
   (a) a cam surface on the first bearing surface of the first body member, the cam surface being inclined to the longitudinal axis so as to cooperate with the semi-annular faces of the second and third body members so as to generate the said inwards forces on the second and third body members.
5. A connector as claimed in claim 1, in which:
   (a) the first bearing surface of the first body member, and the semi-annular bearing surfaces of the second and third body members are portions of complementary conical surfaces.
6. A connector as claimed in claim 1, in which the resilient means include:
   (a) a spring-urged detent member mounted on one connector portion to apply a force to the remaining connector portion to generate a component of force parallel to the longitudinal axis.
7. A connector as claimed in claim 6, in which:
   (a) the spring-urged detent member has an outer portion extending outwardly from one body member of one connector portion to contact an adjacent body member of the remaining connector portion,
   (b) the adjacent body member has at least a portion of an annular groove to receive the outer portion of the spring-urged member to permit swivelling of one body member with respect to the other body member about the longitudinal axis.
8. A connector as claimed in claim 7, in which:
   (a) the second and third body members have respective inner portions having respective semi-annular end faces,
   (b) at least one spring-urged member is mounted on each end face of the second and third body members,

(c) the outer portion of the first body member has an annular face disposed generally oppositely to the first bearing surface, the annular face of the first body member being closely adjacent the semi-annular end faces of the second and third body members when fitted closely thereto, the annular face surrounding the neck portion and having an annular groove concentric with the longitudinal axis to receive the spring-urged members of the second and third body members therein.

9. A connector as claimed in claim 8, in which the end faces of the first, second and third members are disposed generally normally to the longitudinal axis.

10. A connector as claimed in claim 1, in which:
(a) at least one of the second and third body members are provided with separator means for permitting an operator to grip at least one of the second and third body members to apply an outward force thereto so as to separate the second and third body members generally laterally of the longitudinal axis to permit disassembly of the connector.

11. A connector as claimed in claim 10, in which the separator means includes:
(a) the second and third body members have recesses adjacent the longitudinally aligned main faces thereof, the recesses being sufficiently large to receive a digit of an operator's hand therein to apply an outwards force to the second and third body portions for said separation.

12. A connector as claimed in claim 6, in which the spring-urged member is a ball, and a coil spring cooperates with the ball and a chamber within one of the members to force the ball outwardly from the member, the member having stop means to prevent full displacement of the ball outwardly from the opening within the member.

13. A connector as claimed in claim 1, in which the resilient means includes:
(a) at least one body member having a chamber disposed generally parallel to the longitudinal axis,
(b) a detent member mounted for movement within the chamber and generally parallel to the longitudinal axis,
(c) a coil spring within the chamber and cooperating with the detent member to force the detent member outwardly of the chamber,
(d) stop means from preventing the detent member from leaving the chamber.

14. A connector as claimed in claim 8, in which:
(a) the annular face of the first body member is disposed oppositely to and spaced from the semi-annular end faces of the second and third body members by a gap, the gap having a width which reflects wear of the apparatus.

* * * * *